United States Patent [19]

König

[11] Patent Number: 4,984,557

[45] Date of Patent: Jan. 15, 1991

[54] BAKING OVEN

[76] Inventor: Helmut König, Rotomoosweg 15, A-8045 Graz, Austria

[21] Appl. No.: 294,570

[22] PCT Filed: Apr. 15, 1987

[86] PCT No.: PCT/AT87/00028

§ 371 Date: Oct. 18, 1988

§ 102(e) Date: Oct. 18, 1988

[87] PCT Pub. No.: WO87/06101

PCT Pub. Date: Oct. 22, 1987

[30] Foreign Application Priority Data

Apr. 18, 1986 [AT] Austria .................. 1038/86

[51] Int. Cl.$^5$ .................. A21B 1/00; F24C 15/32
[52] U.S. Cl. .................. 126/21 A; 126/20; 99/352; 99/443 R; 99/447; 99/474; 219/386; 219/400; 219/401
[58] Field of Search .......... 126/19 R, 21 A, 21 R, 126/19.5, 273 R; 34/191, 225; 432/200; 99/474, 443 C, 477, 447, 476, 443 R; 219/388, 386, 400, 401

[56] References Cited

U.S. PATENT DOCUMENTS

| 4,032,289 | 6/1977 | Johnson et al. | 126/21 A |
| 4,202,259 | 5/1980 | Johansson | 126/20 |
| 4,779,604 | 10/1988 | Konig | 126/21 A |
| 4,782,214 | 11/1988 | Voegtlin | 126/21 A |
| 4,785,151 | 11/1988 | Voegtlin | 126/21 A |

FOREIGN PATENT DOCUMENTS

| 326063 | 11/1975 | Austria . |
| 378469 | 12/1985 | Austria . |
| 2857125 | 2/1980 | Fed. Rep. of Germany . |
| 2484200 | 6/1980 | France . |

Primary Examiner—James C. Yeung
Attorney, Agent, or Firm—Salter & Michaelson

[57] ABSTRACT

The invention refers to a baking oven having a baking chamber which is accessible via a door and which is designed for introducing therein a carriage carrying baking goods so that the carriage is stationary during a baking process. The baking oven comprises two air channels extending laterally of the baking chamber at both sides thereof over the effective height of the baking chamber and being each separated from the baking chamber by a partition provided with a plurality of air passage openings. The air channels are, during the baking process, alternately supplied by a blower and, via a switching equipment, with hot air heated by a heating means. The hot air is humidified by a vapor supply means and transversely passes the baking chamber in alternating directions and is subsequently again sucked back along a closed circuit to the suction side of the blower. The blower and heating means are arranged at a higher level than the baking chamber and at least partially above said baking chamber.

9 Claims, 2 Drawing Sheets

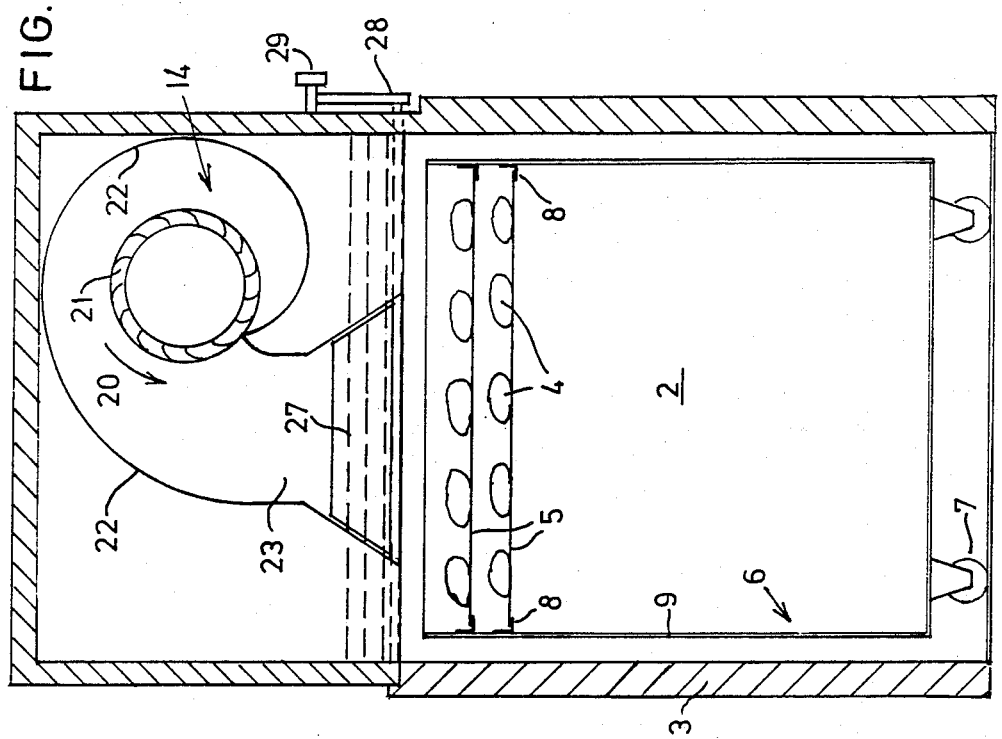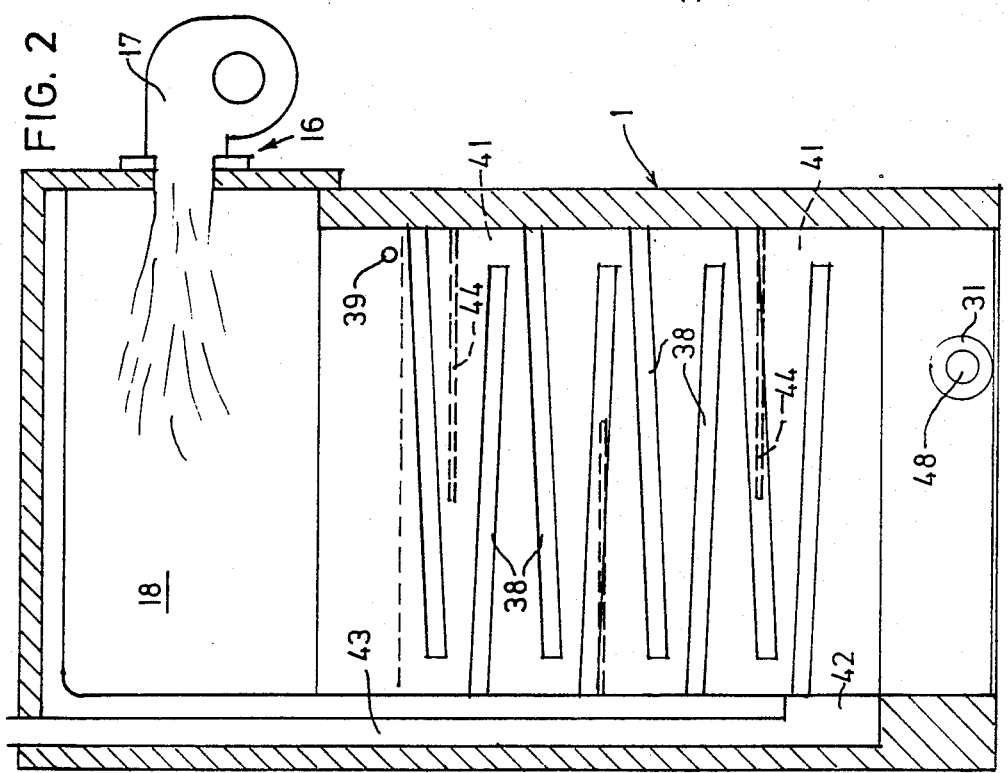

BAKING OVEN

BACKGROUND AND SUMMARY OF THE INVENTION

A baking oven of the general type under consideration is known from Austrian Pat. Specification No. AT-PS 326 063 and has the advantage that the baking good is, goods are, notwithstanding of a small width of the baking oven, uniformly subjected to the action of the hot air flowing through the baking chamber in alternating direction but always in an essentially horizontal direction. In this known construction, there exists, however, a certain drawback on account of the vapor supply means being arranged in lower lateral niches of the baking chamber and thus being in need of a separate heating means for becoming effective for the production of vapors. It is the object of the invention to avoid these drawbacks and to improve a baking oven of the initially described type such that an effective and energy-saving vapor supply is achieved and the advantages of the known construction mentioned before are maintained. This task is, according to the invention, solved in that a suction opening for the removal of air emerging from the baking chamber is arranged within the baking chamber at the lower portion thereof, through which suction opening the air flowing to the suction side of the blower in a return channel arrives at the vapor supply means arranged at the level of the baking chamber. The above task is further solved in that the return channel leads from the vapor supply means to the blower via the heating means which is arranged at a higher level than the vapor supply means. On account thereof, the vapor supply means is heated by the warm air emerging from the baking chamber and simultaneously an effective and reliable humidification of this air by the steam generated in the vapor supply means is obtained, said steam being continuously removed from the vapor supply means by the air passing past this vapor supply means and flowing along a closed circuit, so that this steam becomes effectively mixed with the atmosphere in the baking chamber. On account of the vapor supply means being, in particular if this means extends over a major portion of the height of the baking chamber, very effective but having an only very small space requirement as measured in direction of the width of the baking oven, the total width of the baking oven is — as compared with the initially described known construction — increased for only a negligible degree even if the vapor supply means is arranged laterally of the baking chamber. In particular this is because of because the basic concept, i.e. the arrangement of the heating means and of the blower, at least partially, preferably for the major portion or in total, above the baking chamber or, respectively, above the air passages supplying hot air to the baking chamber, is maintained. Preferably, the vapor supply means extends over a major portion of the height of the baking chamber, which increases the effectivity of the vapor supply means.

According to the invention, it is of particular advantage to arrange the suction opening at the lowermost location of the baking chamber.

According to a preferred embodiment of the invention, the vapor supply means comprises a plate extending in parallel relation to the wall of the baking chamber and having arranged thereon several chutes for water extending in an inclined direction, said plate being circulated around at its front side and back side by the air being supplied via the suction opening. Such a construction of the vapor supply means is particularly advantageous just in connection with the construction according to the invention, because a highly effective vapor supply is obtained with an only small space requirement in direction of the width of the baking oven.

According to a further development of the invention, a flue gas channel contacts one side of the vapor supply means, preferably the side averted from the baking chamber, said flue gas channel leading from the heating means downwardly to a flue gas exhaust opening arranged at the level of the lowermost area of the vapor supply means, preferably at its lowermost location. In this manner, also the heat of the effluent gases of the heating means, which can be an oil heating means or a gas heating means, is utilized for the production of vapors, which has an advantageous effect when heating up the oven or, respectively, when producing the vapor atmosphere for the first time. The arrangement of the flue gas channel at the side of the vapor supply means being averted from the baking chamber facilitates supply of the flue gases into the flue gas exhaust opening, because, in this manner, the flue gas channel need not extend to a lower level than the lower edge of the vapor supply means. For the purpose of obtaining a heat transition of maximum intensity from the flue gases onto the plate of the vapor supply means, the flue gas channel extends, according to the invention, like a meandering line along the plate of the vapor supply means.

This arrangement can also be used to expell, if this is desired, the baking chamber atmosphere from the baking chamber into the chimney. For this purpose, the arrangement is, according to the invention, selected such that a channel, which can be closed by a closure member and which opens into the flue gas channel preferably at a location located remote from the flue gas exhaust opening, opens into the return channel, preferably within the suction opening or close behind this suction opening. In normal condition, this closure member is closed, so that the initially mentioned closed circuit for the circulated air is maintained. If, however, fresh air is, in a manner known per se, introduced into the baking chamber, the closure member is then opened and removal of the baking chamber atmosphere from the baking chamber into this passage is given free. Arranging the entrance of this passage into the flue gas channel at a location located remote from the flue gas exhaust opening provides the advantage that the humid air is dried prior to entering the chimney, so that incrustation of the chimney is avoided. Opening of the closure member may automatically be effected, for example by the positive pressure generated within the baking chamber when introducing therein fresh air, and for this purpose there can be arranged, according to the invention, at the branching location a weight-loaded lid as the closure member.

DESCRIPTION OF THE DRAWINGS

In the drawing, the subject of the invention is schematically illustrated with reference to examples of embodiments.

FIGS. 2 and 3 show sections along the lines II—II and III—III, respectively, of FIG. 1.

Figure 1:
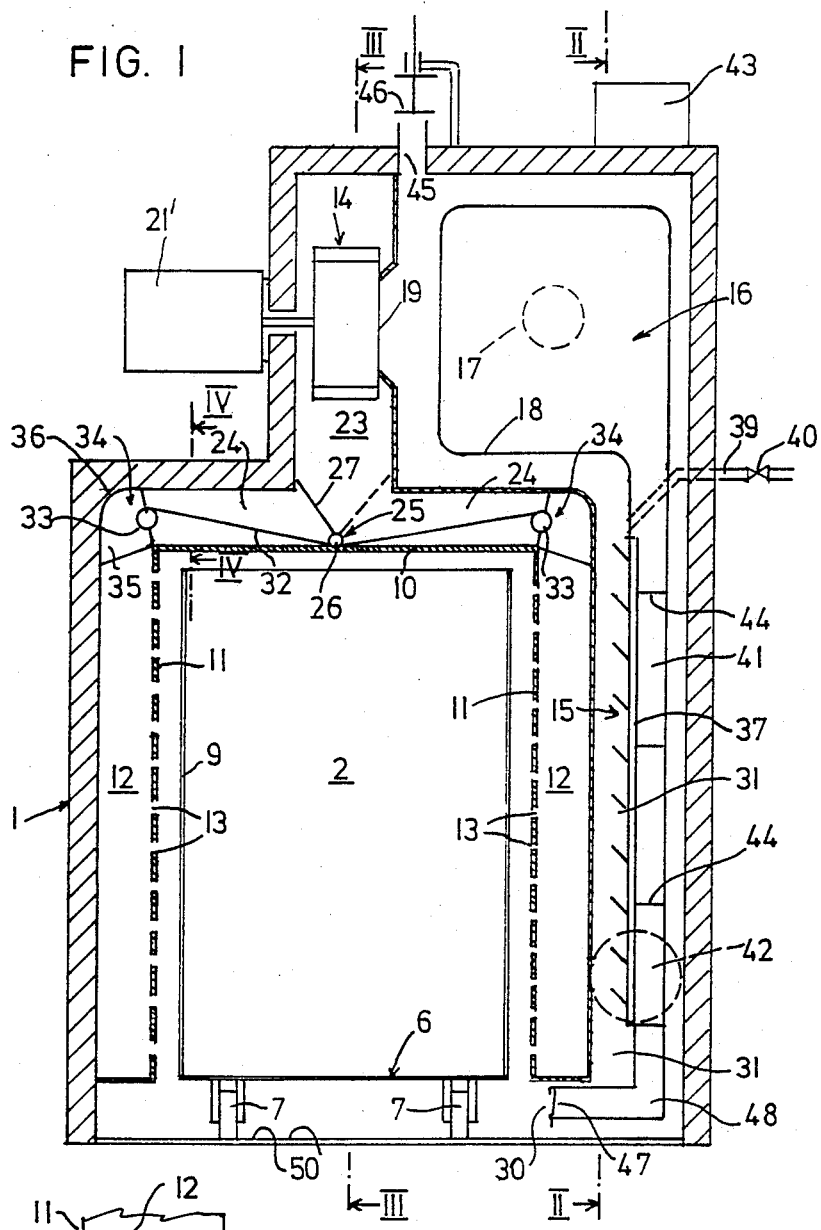
FIG. 1 shows a vertical section through the baking oven.

The baking oven according to FIG. 1 has a heat-insulating housing 1, in which is provided a walkable baking chamber 2, which is accessible via a door (FIG. 3) and into which can be rolled on wheels 7 a carriage 6 onto a bottom plate 5, said carriage 6 carrying baking goods 4 on support members 5, in particular baking plates. This carriage 6 can as a whole be moved out of the baking chamber 2, can be separated from the baking oven and can be interchanged against an other carriage. Each carriage 6 fits into the baking chamber 2 with small lateral play and upper play. The support members 5 rest on angle rails 8 carried by lateral posts 9 of the carriage 6. The baking chamber 2 is air-tightly closed at its upper side by a cover wall 10 and likewise at its rear wall, as seen in direction of introducing the carriage 6. Both side walls of the baking chamber 2 are limited over its effective height (i.e. that height over which support members 5 carrying the baking good 4 are arranged on the carriage 6) by partitions 11, behind which are located air channels 12 vertically extending over the whole effective height of the baking chamber 2 and having a depth, as measured in direction of introducing the carriage 6, equal to the depth, measured in the same direction, of the baking chamber 2. Air enters in alternating direction into the baking chamber 2 from these air channels and via air passage openings 13, which will later be described in greater detail. The air passage openings 13 are preferably small slots which extend over the depth of the baking chamber 2. The support members 5 of the carriage 6 are conveniently arranged such that each support member is located at a somewhat higher level than one of the slot-shaped air passage openings 13. Somewhat below the respective opening 13, the carriage 6 has a horizontal baffle plate forming together with the support member located thereabove a channel for the air being blown into the baking chamber 2 via the respective air passage opening 13, said channel forcing this air against the center of the carriage 6 or baking chamber 2, respectively. Such channels are described in the published international patent application WO 86/01077.

Hot, humid air is supplied to the air channels 12 arranged at both sides of the baking chamber 2 by a blower 14 arranged above the baking chamber 2. The air sucked by this blower 14 is humidified by a vapor supply means 15 and is heated by a heating means 16. In the embodiment shown, the heating means 16 has an oil burner or gas burner 17 (FIG. 2) flanged to the top of the housing 1, the flame of this burner entering a flame tube 18 of a usual heat exchanger which is contacted by the air sucked by the blower 14 via its suction tube 19 (FIG. 1). In place of such a burner 17 and of the associated flame tube 18 it is also possible to use an electrical heating radiator of usual design consisting of several parallel heating rods being contacted by the air to be heated. The heating means 16 is located at least partially above the baking chamber 2 and said both air channels 12, respectively, and equally at least partially above the vapor supply means 15.

The air sucked by the blower 14 via its suction tube 19 is put into a vortex stream by the rotor 21 of the blower which is always rotated in the same direction (arrow 20, FIG. 3) by a motor 21' being flanged to the housing 1. The air is fed by the spiral-shaped mantle 22 of the blower 14 into a short vertical channel 23 formed of the outlet tube of the blower and directed in vertical direction against the cover wall 10 of the baking chamber and is directed to the center of this cover wall 10. Air supply channels 24 extending above the cover wall 10 of the baking chamber 2 and alternately supplied with hot air by a switching equipment 25 are branched off this channel 23 in direction to both sides of the baking oven and lead to the air channels 12. For this purpose, the switching equipment 25 has an air deflection flap 27 which is swivellable around a horizontal axis 26 extending in direction of introducing the carriage 6, said air deflection flap being arranged at the entrance area of the channel 23 into said both air supply channels 24 such that it can be swiveled between two limit positions, one of which is shown in full lines in FIG. 1, whereas the other is shown in dashed lines. In the limit position shown in full lines, the air deflection flap 27 shuts the air supply channel 24 shown at the left-hand side of FIG. 1, whereas the air supply channel 24 shown at the right-hand side of FIG. 1 is shut in the other limit position. In each of both limit positions, the flap 27 formed of a plane plate is inclined for approximately 45°, so that the air coming through the vertical channel 23 is, as much as possible, smoothly deflected into the just active horizontal air supply channel 24. The cross section of the channel 23 is, as seen in direction of introducing the carriage 6, increasing in direction from top to bottom, in particular in the area having arranged therein the flap 27 (FIG. 3), noting that this flap 27 has a trapezoidal shape and is swivellable about the broader basis edge of the trapeze. The axis 26 is designed as a shaft on which the flap 27 is rigidly mounted. This shaft extends out of the housing in a sealed manner and is connected with a lever 28 (FIG. 3), which is switched over by a geared motor 29 in rythmic intervals, for example in intervals of 30 seconds, so that the flap 27 is, in time intervals of 30 seconds, switched over into the respective other limit position and thus the flow direction of air within the baking chamber 2 is changed. The baking chamber 2 is flown through by the warm air in an approximately horizontal direction, said warm air being sucked out of the baking chamber 2 at the lowermost location thereof via a suction opening 30 and is supplied into a return channel 31, in which is arranged the vapor supply means 15, which is thus contacted by the air emerging from the baking chamber 2. From this location, the air flows back to the blower 14 via the heating means 16, so that there exists a closed circuit for the baking air.

The housing, which is formed by the mantle, 22 of the blower 15 is formed as a circulating fan which is helical in shape and has at its area of transition into the channel 23 a width corresponding only to a fraction of the depth of the baking oven. Also the channel 23 shall not be increased in its width to the total depth of the baking chamber if too great a pressure drop shall be prevented within this channel. To be in the position to uniformly supply with hot air the air channels 12 extending over the whole depth of the baking chamber, the width of each supply channel 24 is continuously enlarged in direction to the air channel 12 until it has attained at the area of transition into this air channel the whole depth of the baking chamber as measured in direction of insertion of the carriage 6. For the purpose of avoiding a strong pressure drop within the air supply channel 24, the bottom wall 32 of each air supply channel 24 is inclined relative to the axis 26, noting that the end, located at a higher level, of the bottom wall is supported on a horizontal tube 33. This tube 33 carries additionally an arrangement 34 for equalizing the air flow and extending above the corner of the baking chamber. This arrangement 34 has a plurality of vertical extending lamellae 35 (FIG. 1,4) which are fixed in parallel relation on the tube 33 at equal distances one from the other and having their planes oriented in direction of the air flow. The outer edges of these lamellae 35 contact the rounded edges 36 of the housing 1. This arrangement 34 forms a straightener for the air flow which substantially eliminates the vortex flow introduced into the air stream on account of the nozzle-like action of the air supply channel 24 and which simultaneously deflects the air into the correct direction, i.e. vertically downward. On account of this arrangement being, like the whole air flow guide being decisive for the baking chamber 2, symmetrical relative to the vertical axis of the baking chamber 2, there results the same conditions for both directions of the baking air flowing through the baking chamber 2 in alternating direction.

The vapor supply means 15 arranged within the return channel 31 is located at the level of the baking chamber 2 and has a flat plate 37 which is arranged in parallel relation to the adjacent partition 11 and which has at its side facing this partition 11 several chutes 38 assuming inclined positions and consisting of rails welded to the plate 37 and alternately inclined in forward and rearward direction, respectively, (FIG. 2). If steam is needed in the baking atmosphere, water is supplied onto the topmost chute 38 through a tube 39 via a solenoid valve 40, noting that the water flows along each chute 31 until its lower end and drops from this location on the chute 38 located below. On account of the water flowing along the plate 37 along a meandering path, the water has ample time for becoming evaporated. The plate 37 forms an evaporater plate which, together with the chutes 38, forms a relatively great mass being heated during the heating stage. This is effected, on the one hand, by the hot air of the baking oven flowing around the plate 37 at its both sides and, on the other hand, by the heat of the flue gases which are guided along the plate 37 within a flue gas channel 41 (FIG. 1, 2). This flue gas channel extends, starting from the flame tube 18, along a meandering line at the side of the plate 37 being averted from the partition 11 and in contact with this plate and leads to a flue gas exhaust opening 42 located at the level of the lowermost location of the vapor supply means 15 and allowing the flue gases to flow into an exhaust channel 43 arranged at the rear wall of the baking oven and being connected to the chimney. The mentioned meandering shape of the flue gas channel 41 is formed by horizontal transverse walls 44, arranged within this channel and not extending over the whole width of the flue gas channel 41.

Figures 4, 5:
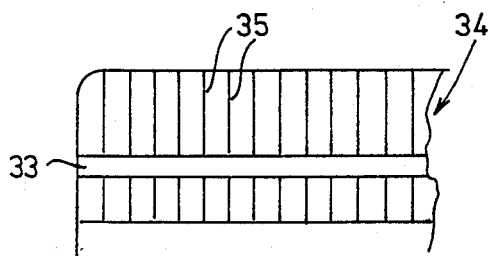
FIG. 4 is a section, in a greater scale, along line IV—IV of FIG. 1.
FIG. 5 shows a detail of FIG. 1 in a greater scale.

Within the area of negative pressure of the blower 14, there is located in the housing 1 an opening 45 which can be tightly closed by a lid 46. If it is intended to remove the steam from the baking oven, this lid 46 is lifted by a lifting magnet not shown, so that the opening 45 is cleared. The steam or the warm air is expelled from the baking chamber 2 by the entering fresh air. Under the action of the positive pressure being thus generated within the baking chamber 2, a closure member 47 (FIG. 1, 5) which is formed of a weight-loaded steam overpressure flap and swivelable around a horizontal axis 49, is opened and thus brought into the open position shown in dashed lines in FIG. 5. The closure member 47 is arranged at the entrance of a channel 48 which is branched off the return channel 31 already within the suction opening 30 and which opens into the flue gas channel 41 at a location which is, as much as possible, located far away of the flue gas discharge opening 42. In FIG. 2, there can be seen that this entrance location is located within the area of the front wall of the oven, whereas the flue gas discharge opening 42 is arranged in the rear wall of the oven. Steam expelled from the baking chamber 2 thus flows via the weight loaded closure member 47 along part of the vapor supply means 15 and finally becomes mixed with the flue gas coming from the flame tube 18, whereupon this flue gas is, together with the steam, fed into the chimney via the flue gas discharge opening 42. The advantage of this system consists in that the very wet steam is dried by the flue gas and above all, by the hot walls of the vapor supply means 15, so that incrustation of the chimney is prevented.

The air deflecting flap 27 and its actuating device, respectively, are designed such that this flap 27 can be fixed in a vertical intermediate position. The air supplied by the blower 14 then flows at both sides of the flap 27 in equal amounts into both channels 12 via both air supply channels 24. This has as an effect that both partitions 11 may be maintained in a uniform heated condition also if the door 3 is in open position.

I claim:

1. A baking oven comprising baking chamber means defining a baking chamber (2) including a front wall having in access door therein and a pair of opposite side partition walls (11) each having a plurality of air passage openings (13) therein, said baking chamber (2) being adapted for receiving therein a carriage (6) carrying baking goods for carrying out a baking process during which said carriage (6) is maintained in a substantially station disposition in said baking chamber (2), means defining a pair of air channels (12), one of said air channels (12) extending along each of said side partition walls (11), said air channels (12) extending substantially along the entire effective height of said baking chamber (2) and communicating with said baking chamber (2) through said air passage openings (13), blower means (14) for receiving a return air stream and for discharging a corresponding air inlet stream, means for controlling the flow of said air inlet stream so that it alternatively passes into one or the other of said air channels (12) and then into said baking chamber (2), return channel means (31) communicating with said baking chamber (2) through a suction opening (30) located adjacent the lower end of said baking chamber (2) for withdrawing said return air stream from said baking chamber (2) and for returning it to said blower means (14), heater means (16) for heating said return air stream before it passes into said blower means (14) and humidifier means (15) for humidifying said return air stream before it passes into said heater means (16), said blower means (14) and said heater means (16) being disposed at elevations which are higher than the upper extremity of said baking chamber (2) and being located at least partially directly above said baking chamber (2), said humidifier means (15) being disposed laterally of said baking chamber (2) at an elevation which is above said suction opening (30) but below said heater means (16) and being coextensive in a longitudinal direction of said return channel means (31) with a portion thereof so that said return air stream streams around said humidifier means is aid longitudinal direction.

2. A baking oven a claimed in claim 1, characterized in that the suction opening (30) is arranged at the lowermost location of the baking chamber (2).

3. A baking oven as claimed in claim 1, characterized in that the humidifier means (15) extends along a major portion of the height of the baking chamber (2).

4. A baking oven as claimed in claim 1, characterized in that the humidifier means (15) comprises a plate (37) having front and back sides and arranged in said return channel means (31) in parallel relation to the adjacent side partition wall (11) of the baking chamber and a plurality of chutes (38) for water on said plate (37), said chutes (38) being inclined upwardly, air in said return air stream circulating around said plate (37) as it travels through said return channel means (31).

5. A baking oven as claimed in claim 1, further comprising flue gas channel means (41) in contact with said humidifier means (15), said flue gas channel means (41) extending downwardly from said heater means (16) along said humidifier means (15) to a flue gas exhaust opening (42) located adjacent the lowermost extremity of said humidifier means (15).

6. A baking oven as claimed in claim 5 further comprising a channel member (48) and a closure member (47) for closing said channel member (48), said channel member (48) opening into said flue gas channel means (41) at a location which is remote from said flue gas exhaust opening (42) and opening into said return channel means adjacent said suction opening.

7. In the baking oven of claim 6, said closure member (47) further characterized as a weighted lid and being located at the point where said channel member (48) opens into said return channel means (31).

8. A baking oven as claimed in claim 5, characterized in that the flue gas channel means (41) extends like a meandering line along the plate (37) of the humidifier means (15).

9. In the baking oven of claim 1, said baking chamber means (2) including a tightly closed cover wall (10).

* * * * *